US009565142B2

(12) United States Patent
Zhou et al.

(10) Patent No.: US 9,565,142 B2
(45) Date of Patent: Feb. 7, 2017

(54) INSTANT MESSAGING SYSTEM AND METHOD

(71) Applicant: TENCENT TECHNOLOGY (SHENZHEN) COMPANY LIMITED, Shenzhen, Guangdong (CN)

(72) Inventors: Bin Zhou, Shenzhen (CN); Sen Sheng, Shenzhen (CN)

(73) Assignee: TENCENT TECHNOLOGY (SHENZHEN) COMPANY LIMITED, Guangdong (CN)

( * ) Notice: Subject to any disclaimer, the term of this patent is extended or adjusted under 35 U.S.C. 154(b) by 0 days.

(21) Appl. No.: 15/101,855

(22) PCT Filed: Feb. 3, 2015

(86) PCT No.: PCT/CN2015/072135
§ 371 (c)(1),
(2) Date: Jun. 3, 2016

(87) PCT Pub. No.: WO2015/081911
PCT Pub. Date: Jun. 11, 2015

(65) Prior Publication Data
US 2016/0308796 A1    Oct. 20, 2016

(30) Foreign Application Priority Data

Dec. 6, 2013  (CN) .......................... 2013 1 0656233

(51) Int. Cl.
*H04L 12/58*    (2006.01)
*H04L 29/08*    (2006.01)
(Continued)

(52) U.S. Cl.
CPC ........... *H04L 51/04* (2013.01); *G06F 17/3089* (2013.01); *G06Q 30/0277* (2013.01); *H04L 51/10* (2013.01); *H04L 67/26* (2013.01)

(58) Field of Classification Search
None
See application file for complete search history.

(56) References Cited

U.S. PATENT DOCUMENTS

2002/0123912 A1* 9/2002 Subramanian .... G06F 17/30867
705/5
2009/0216682 A1    8/2009 Foladare et al.
(Continued)

FOREIGN PATENT DOCUMENTS

| CN | 101043348 A | 9/2007 |
|---|---|---|
| CN | 101667998 A | 3/2010 |
| CN | 103455592 A | 12/2013 |

OTHER PUBLICATIONS

International Preliminary Report on Patentability and Written Opinion of the International Searching Authority for International Application No. PCT/CN2015/072135, mailed May 12, 2015, 6 pages.
(Continued)

*Primary Examiner* — Angela Nguyen
(74) *Attorney, Agent, or Firm* — Knobbe Martens Olson & Bear LLP

(57) ABSTRACT

Embodiments of the present disclosure provide an IM system and method. The method includes: receiving and storing a request message from a browser device, which comprises a browser device ID and a media information ID, configuring a request message ID for the request message, recording a first corresponding relationship between the browser device ID, the media information ID and the request message ID; receiving a request message request from a media information pushing device, finding the request message according to the media information ID in the request message request, sending the request message to the media information pushing device; receiving and storing a feedback message obtained by the media information pushing device according to the request message, recording a second
(Continued)

corresponding relationship between a feedback message ID and the request message ID; receiving a feedback message request from the browser device, finding the feedback message according to the browser device ID and sending the feedback message to the browser device.

10 Claims, 4 Drawing Sheets

(51) Int. Cl.
*G06Q 30/02* (2012.01)
*G06F 17/30* (2006.01)

(56) References Cited

U.S. PATENT DOCUMENTS

2011/0173102 A1* 7/2011 Burns ............... G06Q 30/02
  705/27.2
2011/0179445 A1* 7/2011 Brown ............... G06Q 30/02
  725/32

OTHER PUBLICATIONS

International Search Report for International Application No. PCT/CN2015/072135 dated May 12, 2015, 2 pages.

* cited by examiner

INSTANT MESSAGING SYSTEM AND METHOD

INCORPORATION BY REFERENCE TO ANY PRIORITY APPLICATIONS

Any and all applications for which a foreign or domestic priority claim is identified in the Application Data Sheet as filed with the present application are hereby incorporated by reference in their entirety under 37 CFR 1.57.

BACKGROUND OF THE INVENTION

Field of the Invention

The present application relates to an Instant Messaging (IM) technology field, and more particularly, to an IM system and method.

Description of the Related Art

The Internet has become media best satisfying people's requirements and most important medium of customers due to its real time and interactivity. Medium information (such as advertisements) may be pushed to the customers via the network. Due to rapid speed and ease-to-propagation of the Internet media, more and more people choose obtaining the media information online.

SUMMARY OF THE INVENTION

Embodiments of the present disclosure may provide an IM system, to save system resources and reduce occupied system time.

Embodiments of the present disclosure may further provide an IM method, to save system resources and reduce occupied system time.

The technical scheme of the embodiments of the present disclosure may be as follows.

An IM system includes:

a first server, to receive a request message from a browser device, which comprises a browser device ID and a media information ID, configure a request message ID for the request message, record a first corresponding relationship between the browser device ID, the media information ID and the request message ID, send the request message and the first corresponding relationship to a database, receive a feedback message request from the browser device, search the database according to the browser device ID, obtain a feedback message corresponding to the browser device and send the feedback message to the browser device; and a second server, to receive a request message request from a media information pushing device, search the database for the request message according to the media information ID in the request message request, send the request message to the media information pushing device, receive the feedback message obtained by the media information pushing device according to the request message, record a second corresponding relationship between a feedback message ID of the feedback message and the request message ID, and send the second corresponding relationship and the feedback message to the database.

An IM method includes:

receiving and storing a request message from a browser device, which comprises a browser device ID and a media information ID, configuring a request message ID for the request message, recording a first corresponding relationship between the browser device ID, the media information ID and the request message ID;

receiving a request message request from a media information pushing device, finding the request message according to the media information ID in the request message request, sending the request message to the media information pushing device;

receiving and storing a feedback message obtained by the media information pushing device according to the request message, recording a second corresponding relationship between a feedback message ID and the request message ID;

receiving a feedback message request from the browser device, finding the feedback message according to the browser device ID and sending the feedback message to the browser device.

An embodiment of the present disclosure provides a non-transitory computer readable storage medium, storing computer executable instructions, which are executed by a computer to execute the above method.

It can be seen in the system and method for implementing the IM in the website media information provided by embodiments of the present disclosure, the first server may receive the request message from the browser device, set a request message ID for the request message, store the request message ID in the database, receive a request message request from the media information pushing device using the second server, search for the corresponding request message, send the found request message to the media information pushing device, receive the feedback message from the media information pushing device and store the feedback message in the database. When the first server receives the feedback message request from the browser device, the first server may search for the corresponding feedback message and send the feedback message to the browser device, so that the IM between the browser device and the media information pushing device may be implemented in the website media information. In embodiments of the present disclosure, the feedback message may be provided to the browser device according to the request message from the browser device. Therefore, the feedback message sent to the browser device may be that needed by the user. It may be avoided that a large quantity of feedback information, which may not be needed by the user, may be sent to the user. Therefore, system resources and system time occupied for sending the feedback information may be saved.

DETAILED DESCRIPTION

The media information in the Internet may be displayed on the webpage in a banner advertisement. A pushing party of the media information may upload banner picture material onto a media information platform. The media information may be displayed in a banner advertisement on the webpage. When a user accesses the webpage, the user may directly read the media information to obtain information of a product.

In an embodiment of the present disclosure, when media information is pushed to users, the media information may be randomly pushed to the users without taking requirements of the users into consideration. Therefore, if a large amount of media information is pushed to the user, the pushed media information may not include, or only include a small quantity of media information needed by the user. Therefore, in order to satisfy users' requirements or implement wished pushing effects, the system may need to keep pushing a large amount of media information to the user. The operation of pushing a large amount of media information may occupy a large amount of system resources, such as device memory, bandwidth resources and resources of graphic card. Further, plenty of system time may be occupied to obtain, transmit and display the media information.

Figure 1:
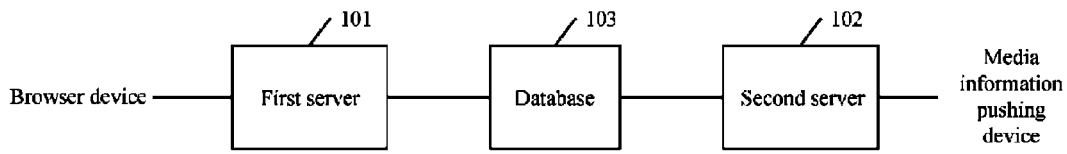
FIG. 1 is a diagram illustrating structure of a system for implementing IM in website media information in accordance with various embodiments of the present disclosure.

An embodiment of the present disclosure provides a system for implementing IM in website media information. FIG. 1 is a diagram illustrating structure of the system. The system may include: a first server 101, a second server 102 and a database 103.

The first server 101 may be configured to receive a request message, which may include a browser device Identity (ID) and a media information ID, from a browser device, set a request message ID for the request message, record a first corresponding relationship between the browser device ID, media information ID and request message ID, send the request message and the first corresponding relationship to the database 103, receive a feedback message request from the browser device, search for the database 103 according to the browser device ID, obtain a feedback message corresponding to the browser device, and send the feedback message to the browser device.

The second server 102 may be configured to receive a request message request from a media information pushing device, search the database 103 according to the media information ID in the request message request to obtain a corresponding request message, send the request message to the media information pushing device, receive a feedback message obtained by the media information pushing device according to the request message, record a second corresponding relationship between a feedback message ID of the feedback message and the request message ID and send the second corresponding relationship and the feedback message to the database 103.

The database 103 may be configured to receive and store the request message and the first corresponding relationship from the first server 101, receive and store the feedback message and second corresponding relationship from the second server 102.

In an embodiment of the present disclosure, the second server may be further configured to record a third corresponding relationship between a media pushing device ID and the request message ID and send the third corresponding relationship to the database 103.

In the above system, the first server 101 may be further configured to denote the request message as un-answered after sending the request message to the database 103 and denote the feedback message as read after sending the feedback message to the browser device.

In an embodiment of the present disclosure, the second server 102 may be further configured to denote the request message as answered after sending the request message to the media information pushing device and denote the feedback message as unread after sending the feedback message to the database 103.

In the system, after the first server 101 receives a feedback message request from the browser device, the first server 101 may be further configured to search the database 103 according to the browser device ID for a feedback message, which may correspond to the browser device and may be denoted as unread, send the feedback message to the browser device and not send the feedback message if the feedback message is denoted as read.

In an embodiment of the present disclosure, after the second server 102 receives the request message request from the media information pushing device, the second server 102 may search the database 103 according to the media information ID in the request message request for a request message denoted as unanswered, send the request message to the media information pushing device, and not send the request message if the request message is denoted as answered.

In an embodiment of the present disclosure, the first server 101 and the second server 102 may be integrated into a same physical entity or may be two independent physical entities.

Embodiments of the present disclosure may be described hereinafter accompanying with figures.

Embodiment One

In an embodiment of the present disclosure, the first server may be a webserver. The second server may be a TCP server. The request message may be a question message for querying a question about the media information. The feedback message may be an answer message for responding to the question.

Figure 2:
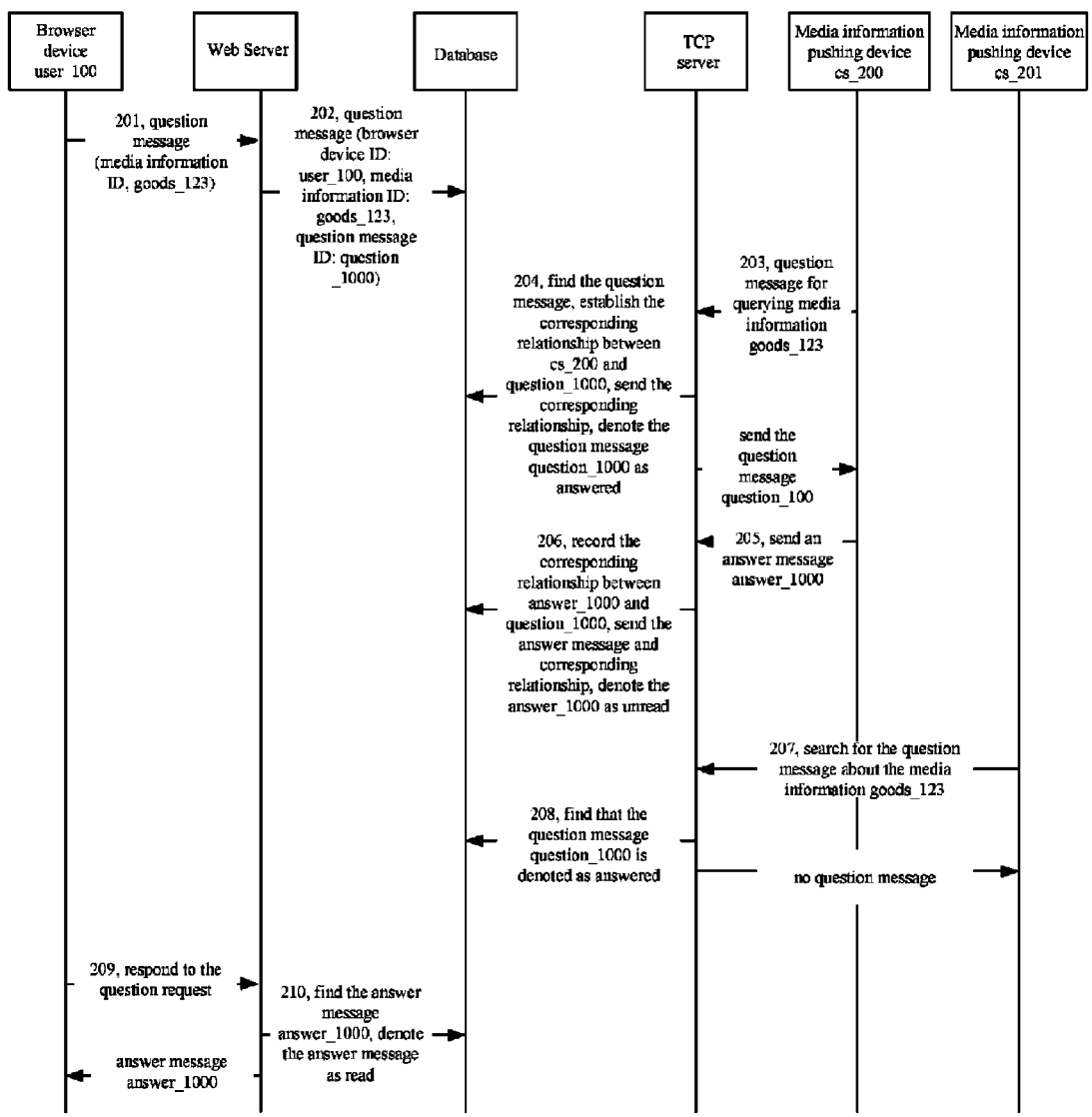
FIG. 2 is a flow chart illustrating a method for implementing IM in accordance with various embodiments of the present disclosure.

FIG. 2 is a flow chart of the embodiment one. FIG. 2 may include following blocks.

At block 201, a browser device, an ID of which may be user_100, may display a "I want to query" button at the bottom of a banner picture. When a browser clicks the "I want to query" button, the browser device may detect a mouse click event and pop up an IM window.

The browser may input a question message for querying the information about the media information, the ID of which may be goods_123, in the IM window. Content of the question message may include: texts or a picture. The browser device may send the question message to the web server via an AJAX post request. The question message may include: the browser device ID (i.e., user_100) and the media information ID (i.e., goods_123).

At block 202, the web server may set a question message ID for the question message, such as question_1000, record a first corresponding relationship between the browser device ID (i.e., user_100), media information ID (i.e., goods_123) and the question message ID (i.e., question_1000), send the question message and the first corresponding relationship to the database and denote the question message as "unanswered". The corresponding relationship stored in the database may be shown in table 1.

TABLE 1

| Browser device ID | Media information ID | Question message ID |
|---|---|---|
| user_100 | goods_123 | question_1000 |

At block 203, the media information pushing device cs_200 may install client software and log in a system. The media information pushing device may provide a query service about media information goods_123, send a request of a question message (called a question message quest) for querying a question about the media information goods_123 to request for obtaining the question message.

At block 204, as for the question message, the TCP server may search the database, find a unanswered question message corresponding to the media information goods_123, i.e., the question_1000 according to the first corresponding relationship stored in the database, send the question message to the media information pushing device cs_200, denote the question message as "answered", record a second corresponding relationship between the media information pushing device ID and the question message ID and send the second corresponding relationship to the database.

In an embodiment of the present disclosure, the TCP server may obtain the question message ID according to the media information goods_123 and the first corresponding relationship and further obtain the question_1000.

The database may store the corresponding relationship shown in FIG. 2.

TABLE 2

| Browser device ID | Media information ID | Question message ID | Media information pushing device ID |
|---|---|---|---|
| user_100 | goods_123 | question_1000 | cs_200 |

After the TCP server receives the question message about the media information goods_123 from the browser device user_100, the TCP server may push the question message to the media information pushing device cs_200. The media information pushing device cs_200 may answer all questions about the media information goods_123 put forward by the viewer device user_100.

At block 205, the media information pushing device cs_200 may send the answer message (the ID may be answer_1000) about the question message, i.e., question_1000 to the TCP server.

At block 206, the web server may record a third corresponding relationship between the answer message ID and the question message ID, send the third corresponding relationship and the answer message to the database, and denote the answer message, i.e., answer_1000 as "unread". The corresponding relationship stored by the database may be shown in table 3.

TABLE 3

| Browser device ID | Media information ID | Question message ID | Media information pushing device ID | Answer message ID |
|---|---|---|---|---|
| user_100 | goods_123 | question_1000 | cs_200 | answer_1000 |

At block 207, the media information pushing device cs_201 may install client software and log into a system. The media information pushing device may also provide a consult server about the media information goods_123. The media information pushing device cs_201 may send a question message request about the media information goods_123 to the TCP server.

At block 208, the TCP server may search for the first corresponding relationship stored in the database, find that the question message question_1000 corresponding to the goods_123 is denoted as "answered", and send an answer message indicating that that is no question message to the media information pushing device cs_201.

At block 209, the browser device user_100 may send an answer message request to the web server to request for the answer message using an AJAX polling scheme.

At block 210, the web server may search the corresponding relationship recorded in the above table 3 according to the ID of the browser device user_100, find the answer message answer_1000 corresponding to the browser device user_100, find that the answer message answer_1000 may be denoted as "unread", send the answer message answer_1000 to the browser device user_100, and denote the answer message answer_1000 as "read".

In an embodiment of the present disclosure, the web server may find the question message ID (question_1000) according to the browser device user_100 and the above corresponding relationship and find the answer message ID according to the question message ID (question_1000) and the third corresponding relationship.

When the web server receives the answer message request from the browser device user_100 again, the web server may find that the answer message answer_1000 corresponding to the browser device user_100 is denoted "read" and not send the answer message to the browser device user_100.

Figure 3:
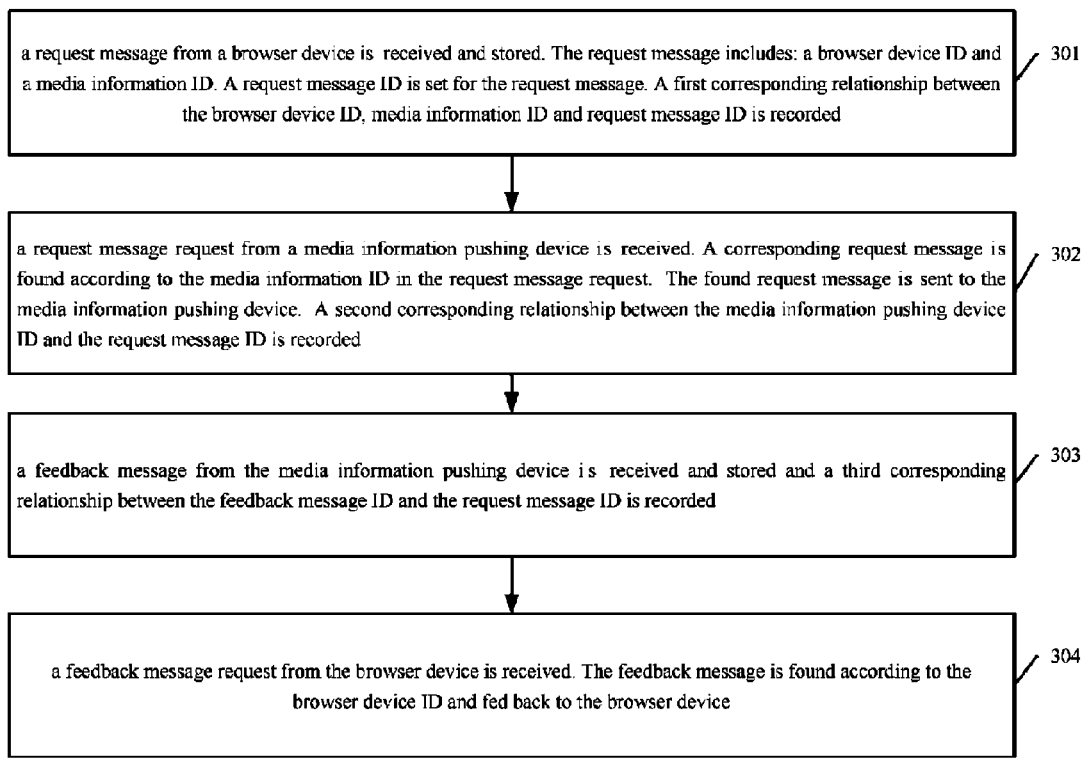
FIG. 3 is a flow chart illustrating a method for implementing IM in website media information in accordance with various embodiments of the present disclosure.

An embodiment of the present disclosure may further provide a method for implementing IM in website media information. The method may be applied to the above system. FIG. 3 may show a flow chart of the method. The method may include following blocks.

At block 301, a request message from a browser device may be received and stored. The request message may include: a browser device ID and a media information ID. A request message ID may be set for the request message. A first corresponding relationship between the browser device ID, media information ID and request message ID may be recorded.

At block 302, a request message request from a media information pushing device may be received. A corresponding request message may be found according to the media information ID in the request message request. The found request message may be sent to the media information pushing device. A second corresponding relationship between the media information pushing device ID and the request message ID may be recorded.

At block 303, a feedback message from the media information pushing device may be received and stored and a third corresponding relationship between the feedback message ID and the request message ID may be recorded.

At block 304, a feedback message request from the browser device may be received. The feedback message may be found according to the browser device ID and fed back to the browser device.

In the block 301, after the request message from the browser device is received and stored, the request message may be denoted as unanswered.

The corresponding request message found in block 302 may be the request message denoted as unanswered. After the request message is fed back to the media information pushing device, the request message may be further denoted as answered.

At block 303, after the feedback message from the media information pushing device is received, the feedback message may be denoted as unread.

The corresponding feedback message found in block 304 may be denoted as unread feedback message. After the feedback message is fed back to the browser device, the feedback message may be denoted as read.

In the above block 304, the browser device may send an answer request using an AJAX polling scheme.

Figure 4:
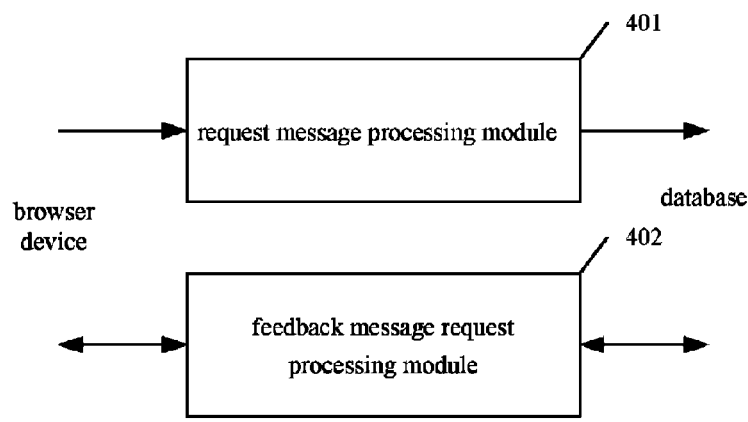
FIG. 4 is a diagram illustrating structure of a web server in accordance with various embodiments of the present disclosure.
Figure 5:
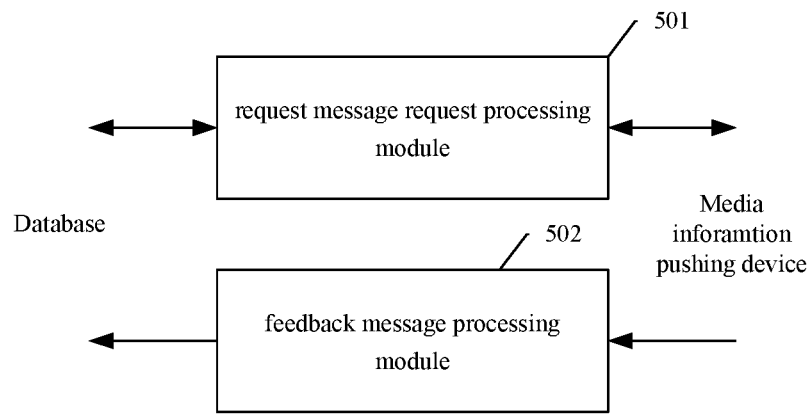
FIG. 5 is a diagram illustrating structure of a TCP server in accordance with various embodiments of the present disclosure.

An embodiment of the present disclosure may further provide a web server for implementing IM in website media information. FIG. 4 may be a diagram illustrating structure of a web server. The webserver may include following modules.

A request message processing module 401 may be configured to receive a request message from a browser device, which may include a browser device ID and a media information ID, configure a request message ID for the request message, record a first corresponding relationship between the browser device ID, media information ID and request message ID and send the request message and the first corresponding relationship to a database.

A feedback message request processing module 402 may be configured to receive a feedback message request from the browser device, search the database according to the browser device ID for a feedback message corresponding to the browser device and send the feedback message to the browser device.

In the web server, the request message processing module 401 may be further configured to denote the request message as unanswered after the request message is sent to the database.

The feedback message request processing module 402 may be further configured to search the database according to the browser device ID after the feedback message request from the browser device is received, obtain the feedback message, which may be denoted as unanswered and correspond to the browser device, send the feedback message to the browser device and denote the feedback message as read after the feedback message is sent to the browser device.

An embodiment of the present disclosure may further provide a TCP server for implementing IM in website media information in accordance with various embodiments of the present disclosure.

A request message request processing module 501 may be configured to receive a request message request from a media information pushing device, search a database according to a media information ID in the request message request to obtain a corresponding request message, send the request message to the media information pushing device, record a corresponding relationship between the media information pushing device ID and the request message ID and send the corresponding relationship between the media information pushing device ID and the request message ID to the database.

The feedback message processing module 502 may be configured to receive the feedback message from the media information pushing device, record a corresponding relationship between the feedback message ID and the request message ID, and send the corresponding relationship between the feedback message ID and the request message ID and the feedback message to the database.

In the TCP server, the request message request processing module 501 may be configured to receive a request message request from the media information pushing device, search the database according to the media information ID in the request message request for a corresponding request message, which may be denoted as unanswered, send the request message to the media information pushing device and denote the request message as answered after the request message is sent to the media information pushing device.

The feedback message processing module 502 may be further configured to denote the feedback message as unread after the feedback message is sent to the database.

Figure 6:
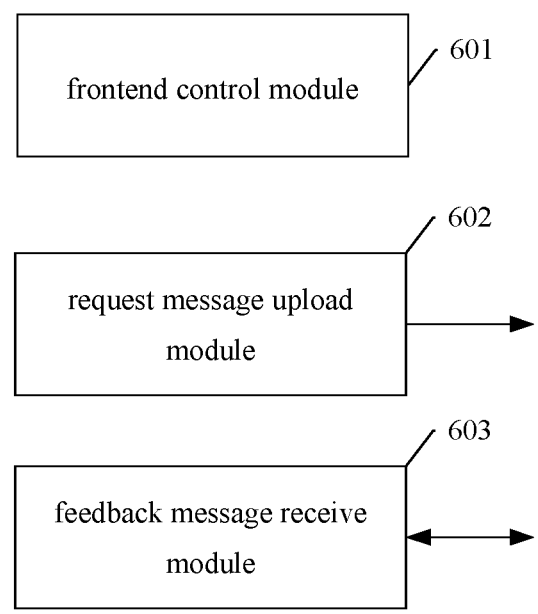
FIG. 6 is a diagram illustrating structure of a terminal device in accordance with various embodiments of the present disclosure.

An embodiment of the present disclosure may further provide a terminal device for implementing IM in website media information in accordance with various embodiments of the present disclosure. FIG. 6 may be a diagram illustrating structure of the terminal device. FIG. 6 may include following modules.

A frontend control module 601 may be configured to display an IM input window according to a request from a browser.

A request message upload module 602 may be configured to receive a request message input by the browser into the IM input window and upload the request message.

A feedback message receive module 603 may be configured to upload the feedback message request, receive and display the feedback message.

In the terminal device, the request message upload module 602 may upload the request message using an AJAX scheme. The feedback message receive module 603 may send the feedback message request using the AJAX.

Figure 7:
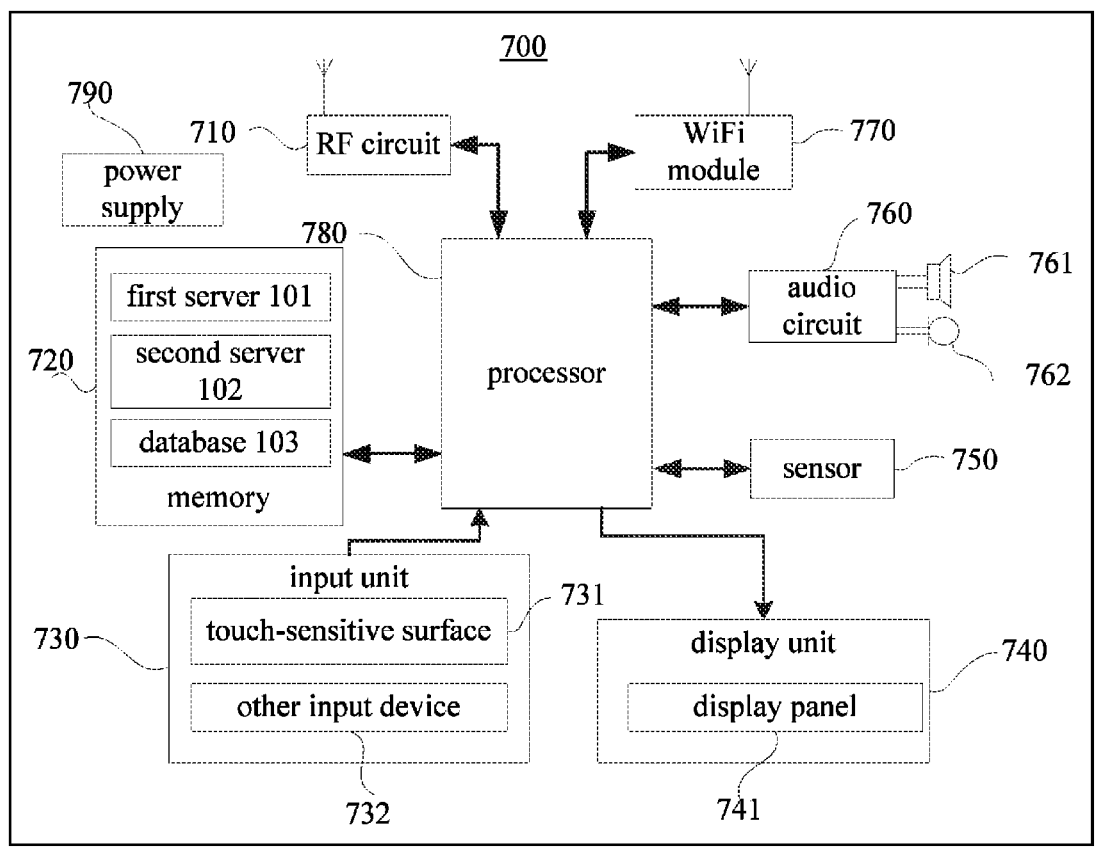
FIG. 7 is a diagram illustrating structure of a system for implementing IM in website media information in accordance with various embodiments of the present disclosure.

FIG. 7 is a diagram illustrating structure of an IM system in accordance with various embodiments of the present disclosure. Referring to FIG. 7, the IM system may be used to implement the IM method in the above embodiments.

The IM system 700 can include an RF (Radio Frequency) circuit 710, a memory 720 including one or more machine-readable storage media, an input unit 730, a display unit 740, a sensor 750, an audio circuit 760, a Wireless Fidelity (WiFi) module 770, a processor 780 including one or more processing cores, a power supply 790, and/or other components. It is well known to an ordinary skilled in the art of the present disclosure that the structure of the IM system shown in FIG. 7 cannot limit the IM system in embodiments of the present disclosure. The IM system in the embodiments of the present disclosure may include more or less components than those in FIG. 7. In another example, the IM system in embodiments of the present disclosure may consist of combination of some components or different component layouts.

The RF circuit 710 may be used to send and receive information or send and receive a signal during communication. In particular, after receiving downlink information from a base station, such information can be processed by the one or more processors 780. Furthermore, the data related to the uplink can be sent to the base station. Generally, the RF circuit 710 can include, but be not limited to, an antenna, at least one amplifier, a tuner, one or more oscillators, user identity module (SIM) card, a transceiver, a coupler, LNA (i.e., Low Noise Amplifier), duplexer, etc. In addition, the RF circuit 710 may communicate with other devices via a wireless communication network. The wireless communication may use any communication standards or protocols, including but not limited to, GSM (Global System for Mobile Communications), GPRS (General Packet Radio Service), CDMA (Code Division Multiple Access), WCDMA (Wideband Code Division Multiple Access), LTE (Long Term Evolution), e-mail, SMS (Short Messaging Service), etc.

The memory 720 can be used for storing software programs and modules. By running software programs and modules stored in the memory 720, the processor 780 can perform various functional applications and data processing. The memory 720 can include a program storage area and a data storage area. The program storage area can store the operating system, applications (such as sound playback, image playback, etc.) required by at least one function. The data storage area can store data (such as audio data, phone book, etc.) created when using the IM system 700. In addition, the memory 720 may include a high-speed random access memory, a non-volatile memory, such as at least one disk memory, flash memory, and/or other volatile solid-state memory elements. Accordingly, the memory 720 may further include a memory controller to provide the processor 780 and the input unit 730 with access to the memory 720. In embodiments of the present disclosure, the storage 720 may be used to store the above first server 101, second server 102 and database 103.

The input unit 730 can be used to receive inputted numeric or character information, and to generate signal input of keyboard, mouse, joystick, and trackball or optical signal input related to the user settings and function controls. Specifically, the input unit 730 may include a touch sensitive surface 731 and other input device(s) 732. The touch-sensitive surface 731, also known as a touch screen or touch panel, may collect touch operations that a user conducts on or near the touch-sensitive surface 731. For example, a user may use a finger, a stylus, and any other suitable object or attachment on the touch-sensitive surface 731 or on an area near the touch-sensitive surface 731. The touch-sensitive surface 731 may drive a connecting device based on a preset program. The touch sensitive surface 731 may include a touch detection device and a touch controller. The touch detection device can detect user's touch position and detect a signal due to a touch operation and send the signal to the touch controller. The touch controller can receive touch information from the touch detection device, convert the touch information into contact coordinates to send to the processor 780, and receive commands sent from the processor 780 to execute. Furthermore, the touch sensitive surface 731 can be realized by resistive, capacitive, infrared surface acoustic wave, and/or other types of surface touch. In addition to the touch sensitive surface 731, the input unit 730 may also include other input device(s) 732. Specifically, the other input device(s) 732 may include, but be not limited to, a physical keyboard, function keys (such as volume control buttons, switch buttons, etc.), a trackball, a mouse, an operating lever, or combinations thereof.

The display unit 740 can be used to display information inputted by the user, information provided to the user, and a variety of graphical user interfaces of the IM system 700. These graphical user interfaces can be formed by images, text, icons, videos, and/or any combinations thereof. The display unit 740 may include a display panel 741 configured by, e.g., LCD (Liquid Crystal Display), OLED (Organic Light-Emitting Diode), etc. Further, the touch sensitive surface 731 may cover the display panel 741. When the touch sensitive surface 731 detects a touch operation on or near the touch sensitive surface, the touch operation can be sent to the processor 780 to determine a type of the touch operation. Accordingly, the processor 780 can provide visual output on the display panel 741. Although in FIG. 7 the touch-sensitive surface 731 and the display panel 741 are shown as two separate components to achieve input and output functions, in some embodiments, the touch sensitive surface 731 and the display panel 741 can be integrated to perform input and output functions.

The IM system 700 may further include at least one sensor 750, such as optical sensors, motion sensors, and other suitable sensors. Specifically, the optical sensors may include an ambient optical sensor and a proximity sensor. The ambient optical sensor may adjust brightness of the display panel 741 according to the brightness of ambient light. The proximity sensor can turn off the display panel 741 and/or turn backlighting, when the IM system 700 moves to an ear. As a type of motion sensor, a gravity sensor may detect amount of an acceleration in each direction (e.g., including three axis) and detect magnitude and direction of gravity when in stationary. The gravity sensor can be used to identify phone posture (for example, switching between horizontal and vertical screens, related games, magnetometer calibration posture, etc.), vibration recognition related functions (e.g., pedometer, percussion, etc.), etc. The IM system 700 can also be configured with, e.g., a gyroscope, a barometer, a hygrometer, a thermometer, an infrared sensor, and/or other sensors.

The audio circuit 760, the speaker 761, and the microphone 762 may provide an audio interface between the user and IM system 700. The audio circuit 760 may transmit an electrical signal converted from the received audio data to the speaker 761 to convert into audio signal output. On the other hand, the microphone 762 can convert the collected sound signal to an electrical signal, which can be received by the audio circuit 760 to convert into audio data. The audio data can be output to the processor 780 for processing and then use the RF circuit 710 to transmit to, e.g., another terminal. Alternatively, the audio data can be output to the memory 720 for further processing. The audio circuit 760 may also include an earplug jack to provide communications between the peripheral headset and the IM system 700.

The WiFi may belong to a short distance wireless transmission technology. The IM system 700 may use the WiFi module 770 to help users send and receive emails, browse websites, access streaming media, etc. The WiFi module 770 can provide users with a wireless broadband Internet access. Although the WiFi module 770 is shown in FIG. 7, it can be understood that the WiFi may not be a necessary component of the IM system 700 and may be omitted without changing the essential scope of the present disclosure.

The processor 780 can be a control center of the IM system 700: using a variety of interfaces and circuits to connect various parts, e.g., throughout a mobile phone; running or executing software programs and/or modules stored in the memory 720; calling the stored data in the memory 720; and/or performing various functions and data processing of the IM system 700 to monitor the overall mobile phone. The processor 780 may include one or more processing cores. In an exemplary embodiment, the processor 780 may integrate an application processor with a modulation and demodulation processor. The application processor is mainly used to process an operating system, user interface, and applications. The modulation and demodulation processor is mainly used to deal with wireless communications. In various embodiments, the modulation and demodulation processor may or may not be integrated into the processor 780.

The IM system 700 may further include a power supply 790 (such as a battery) to power various components of the terminal. In an exemplary embodiment, the power supply 790 can be connected to the processor 780 via the power management system, and thus use the power management system to manage charging, discharging, and/or power management functions. The power supply 790 may also include one or more DC or AC power supplies, a recharging system, a power failure detection circuit, a power converter or inverter, a power status indicator and/or any other suitable components.

Although not shown in FIG. 7, the IM system 700 can further include a camera, a Bluetooth module, etc. without limitation. Specifically, the IM system 700 can have a display unit of a touch screen display, a memory, and one or more programs stored in the memory. The IM system can be configured to use one or more processors to execute the one or more programs stored in the memory 720 to:

receive and store a request message from a browser device, which comprises a browser device ID and a media information ID, configure a request message ID for the request message, record a first corresponding relationship between the browser device ID, the media information ID and the request message ID;

receive a request message request from a media information pushing device, find the request message according to the media information ID in the request message request, send the request message to the media information pushing device;

receive and storing a feedback message obtained by the media information pushing device according to the request message, record a second corresponding relationship between a feedback message ID and the request message ID;

receive a feedback message request from the browser device, find the feedback message according to the browser device ID and send the feedback message to the browser device.

The one or more programs further include instructions executed to:

denote the request message as unanswered after receiving and storing the request message from the browser device;

denote the request message as answered after sending the found request message to the media information pushing device;

denote the feedback message as unread after receiving the feedback message obtained by the media information pushing device according to the request message; and denote the feedback message as read after sending the feedback message to the browser device.

The one or more programs further include instructions executed to:

obtain the request message, which is denoted as unanswered, according to the media information ID in the request message request; and obtain the feedback message, which is denoted as unread and corresponds to the browser device.

The one or more programs further include instructions executed to:

obtain the request message according to the media information ID and the first corresponding relationship; and obtain the request message ID according to the browser device ID and the first corresponding relationship, and obtain the feedback message according to the request message ID and the second corresponding relationship.

The one or more programs further include instructions executed to:

receive the feedback message request sent from the browser device using an AJAX polling scheme.

In summary, in the system and method for implementing the IM in the website media information provided by embodiments of the present disclosure, the question message from the browser device may be received by the web server. An ID may be set for the question message and stored in the database. A question message request may be received from a media information pushing device using the TCP server. The corresponding question message may be found and the found question message may be fed back to the media information pushing device. Then, an answer message from the media information pushing device may be received and the answer message may be stored in the database. When the web server receives the answer message request, the web server may search for the corresponding answer message and send the answer message to the browser device, so that the IM between the browser device and the media information pushing device may be implemented. In embodiments of the present disclosure, the browser device may communicate with the web server using the AJAX polling scheme. The browser device may send the answer message request to the web server using the AJAX polling scheme. The browser device may perform the IM with the media information pushing device without installing the IM software.

What has been described and illustrated herein are embodiments of the disclosure along with some variations. The terms, descriptions and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

What is claimed is:

1. An Instant Messaging (IM) system, comprising:
   a first server, to receive a request message from a browser device, which comprises a browser device ID and a media information ID, configure a request message ID for the request message, record a first corresponding relationship between the browser device ID, the media information ID and the request message ID, send the request message and the first corresponding relationship to a database, receive a feedback message request from the browser device, search the database according to the browser device ID, obtain a feedback message corresponding to the browser device and send the feedback message to the browser device; and
   a second server, to receive a request message request from a media information pushing device, search the database for the request message according to the media information ID in the request message request, send the request message to the media information pushing device, receive the feedback message obtained by the media information pushing device according to the request message, record a second corresponding relationship between a feedback message ID of the feedback message and the request message ID, and send the second corresponding relationship and the feedback message to the database.

2. The system according to claim 1, wherein
   the first service is further to denote the request message as unanswered after sending the request message to the database and denote the feedback message as read after sending the feedback message to the browser device; and
   the second server is further to denote the request message as answered after sending the request message to the media information pushing device and denote the feedback message as unread after sending the feedback message to the database.

3. The system according to claim 2, wherein
the first server is further to search the database according to the browser device ID after receiving the feedback message request from the browser device, obtain the feedback message, which is denoted as unread and corresponds to the browser device, and send the feedback message to the browser device;
the second server is further to search the database according to the media information ID in the request message request after receiving the request message request from the media information pushing device, obtain the corresponding request message, which is denoted as unanswered, and send the request message to the media information pushing device.

4. The system according to claim 2, wherein
the first server is further to search the database according to the browser device ID after receiving the feedback message request from the browser device, obtain the request message ID according to the browser device ID and the first corresponding relationship, obtain the feedback message corresponding to the browser device according to the request message ID and the second corresponding relationship and send the feedback message to the browser device; and
the second server is further to search the database according to the media information ID in the request message request after receiving the request message request from the media information pushing device, obtain the corresponding request message according to the media information ID and the first corresponding relationship, and send the request message to the media information pushing device.

5. An Instant Messaging (IM) method, comprising:
receiving and storing a request message from a browser device, which comprises a browser device ID and a media information ID, configuring a request message ID for the request message, recording a first corresponding relationship between the browser device ID, the media information ID and the request message ID;
receiving a request message request from a media information pushing device, finding the request message according to the media information ID in the request message request, sending the request message to the media information pushing device;
receiving and storing a feedback message obtained by the media information pushing device according to the request message, recording a second corresponding relationship between a feedback message ID and the request message ID;
receiving a feedback message request from the browser device, finding the feedback message according to the browser device ID and sending the feedback message to the browser device.

6. The method according to claim 5, further comprising:
denoting the request message as unanswered after receiving and storing the request message from the browser device;
denoting the request message as answered after sending the found request message to the media information pushing device;
denoting the feedback message as unread after receiving the feedback message obtained by the media information pushing device according to the request message; and
denoting the feedback message as read after sending the feedback message to the browser device.

7. The method according to claim 5, wherein
wherein finding the request message according to the media information ID in the request message request comprises: obtaining the request message according to the media information ID and the first corresponding relationship; and
finding the feedback message according to the browser device ID comprises: obtaining the request message ID according to the browser device ID and the first corresponding relationship, and obtaining the feedback message according to the request message ID and the second corresponding relationship.

8. The method according to claim 5, wherein receiving the feedback message request from the browser device comprises:
receiving the feedback message request sent from the browser device using an AJAX polling scheme.

9. The method according to claim 6,
wherein finding the request message according to the media information ID in the request message request comprises: obtaining the request message, which is denoted as unanswered, according to the media information ID in the request message request; and
finding the feedback message according to the browser device ID comprises: obtaining the feedback message, which is denoted as unread and corresponds to the browser device.

10. A non-transitory computer readable storage medium, storing computer executable instructions, which are executed by a computer to:
receive and store a request message from a browser device, which comprises a browser device ID and a media information ID, configure a request message ID for the request message, record a first corresponding relationship between the browser device ID, the media information ID and the request message ID;
receive a request message request from a media information pushing device, find the request message according to the media information ID in the request message request, send the request message to the media information pushing device;
receive and storing a feedback message obtained by the media information pushing device according to the request message, record a second corresponding relationship between a feedback message ID and the request message ID; and
receive a feedback message request from the browser device, find the feedback message according to the browser device ID and send the feedback message to the browser device.

* * * * *